United States Patent [19]
Andersen

[11] 3,711,986
[45] Jan. 23, 1973

[54] AERATED BAIT KEEPER

[76] Inventor: Harry A. Andersen, 1165 8th Terrace, N., Naples, Fla. 33940

[22] Filed: Nov. 18, 1971

[21] Appl. No.: 199,932

[52] U.S. Cl. .................................................43/57
[51] Int. Cl. ..............................................A01k 97/04
[58] Field of Search.................................43/56, 57

[56] References Cited

UNITED STATES PATENTS

| | | | |
|---|---|---|---|
| 724,539 | 4/1903 | Bourne | 43/56 |
| 1,451,925 | 4/1923 | Ruff | 43/56 |
| 2,244,457 | 6/1941 | Hartford | 43/56 |
| 2,963,814 | 12/1960 | Zabrocki | 43/56 |
| 3,092,926 | 6/1963 | Baker | 43/57 |

*Primary Examiner*—Warner H. Camp
*Attorney*—Gustave Miller

[57] ABSTRACT

A pair of nesting buckets includes inner and outer buckets placed one within the other. The inner bucket has an integral top rim, a bail handle on the rim, concentric inner and outer walls depending from the rim, and a floor on its inner wall. A manually operable air valve extends through the bucket inner wall. An air inlet tube extends from an opening through the inner wall to the annular space between the inner and outer walls. The other end of the air inlet tube extends to near the floor of the inner bucket, and has some spirally located different size openings through its tube wall near the open bottom of the tube. An aerating air escape valve consists of a solid rod lifting snugly yet rotatably within the open bottom end. This rod has a transverse slot extending from its top end to below the air escape holes in the tube, the slot stopping short of the bottom end of the tube.

The outer bucket has an outer wall of a diameter somewhat larger than the outer wall of the inner bucket, and also has an inner concentric wall extending upwardly from its bottom floor, the diameter of this outer bucket inner wall being intermediate the diameters of the inner bucket's inner and outer walls. Water is placed in the annular space between the outer buckets inner and outer walls, to near its top. This water acts as a seal when the inner bucket, with its bait water, and bait, is placed down in the outer bucket, trapping and somewhat compressing the air beneath the inner bucket.

7 Claims, 2 Drawing Figures

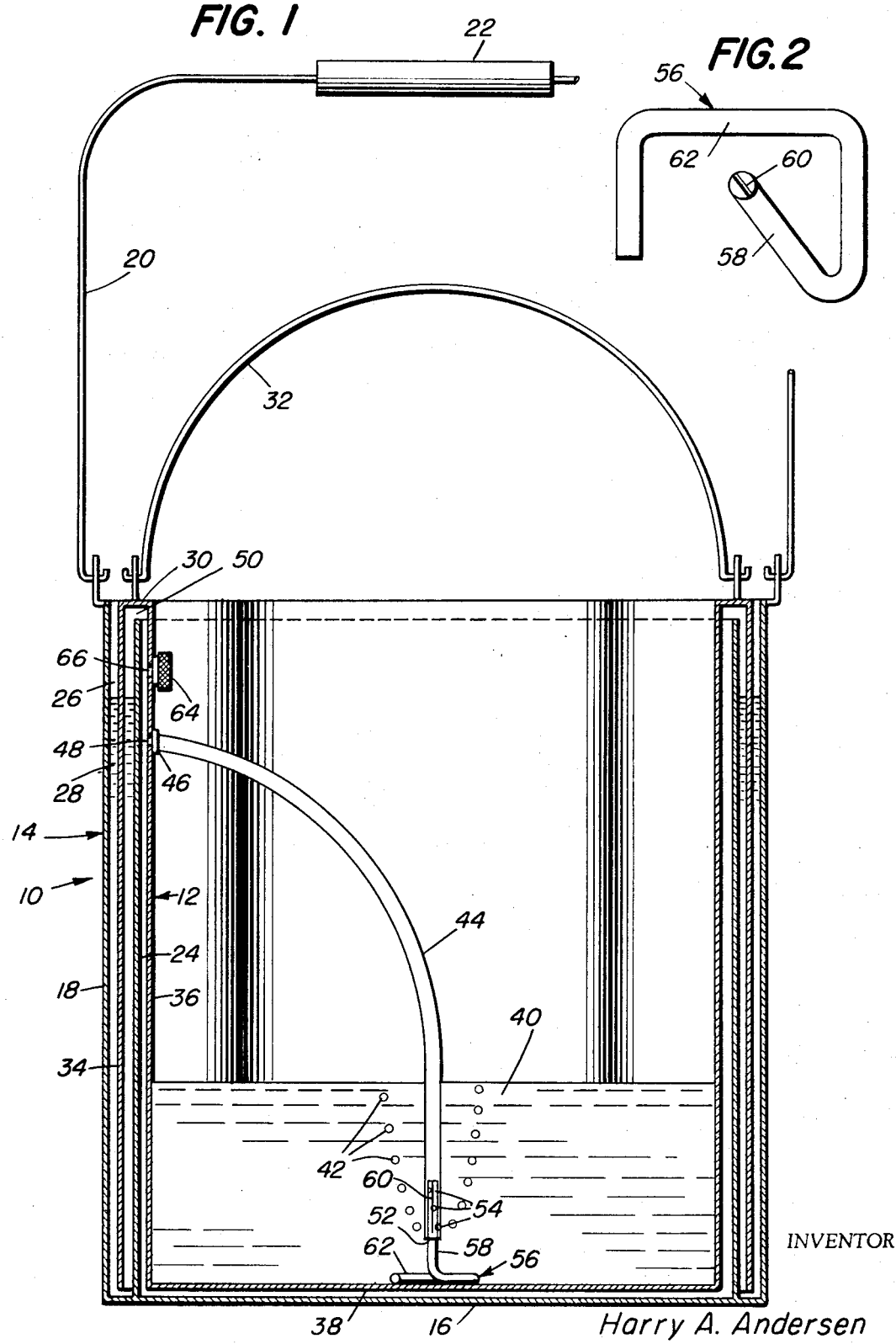

AERATED BAIT KEEPER

OBJECTS OF THIS INVENTION

This invention has for an object to provide an improved aerated live bait bucket for continuously aerating the bait bucket without the use of electrically operated pumps, that is manually actuated about once or twice an hour, to aerate the bucket under the force of gravity.

A further object of this invention is to provide an aerated bucket, which needs only occasional attention, about once or twice an hour, to keep air feeding continuously through the bait water in the bucket.

A further object of this invention is to provide a pair of nestable inner and outer buckets, so constructed that the inner bucket, with its water and bait, is lifted occasionally to trap air between the inner and outer buckets, which air is then forced, by the weight of the inner bucket and its bait water, to travel through and aerate the bait water.

A further object of this invention is to provide an aerated bait bucket which does not need any type of pump to aerate the water, but which uses the force of gravity to force trapped air to feed into and through the bait water, which trapped air is readily replaced each time it is used up, usually about once or twice an hour, depending on the rate of air feed.

A further object of this invention is to provide an aerated bait bucket consisting of a pair of nesting buckets which are pulled somewhat apart to trap air between them and then the trapped air is forced through the bait water by gravity as the inner bucket settles back under gravity into the outer bucket.

A further object of this invention is to provide an aerated bait bucket which is attended to only once or twice an hour to make it self aerating the rest of the time, which, once it is attended to, is kept operating by the force of gravity and is not reliant on electrically or otherwise operated pumps.

A further object of this invention is to provide an aerated bait bucket that is an improvement over prior aerated buckets, particularly those disclosed in U.S. Pat. Nos. 724,539; 2,020,536; 2,683,950; 2,700,243; and 3,136,087.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is a vertical sectional view, partly broken away, of the aerated bait of this invention.

FIG. 2 is an enlarged, somewhat perspective view of the air inlet tube air release valve rod.

DETAILED DESCRIPTION OF THE INVENTION

There is shown at 10 the aerated bait keeper of this invention. This aerated bait keeper 10 consists of two separate nesting pails or buckets, an inner bucket 12 and an outer bucket 14, in which the inner bucket 12 is nested. The buckets 12 and 14 are preferably, although not necessarily, circular in horizontal cross section, but may vary from strictly circular so long as both the inner and outer buckets are somewhat similar in cross section and capable of nesting, and the terms "circular," "concentric," "annular," etc. are to be construed only as requiring that both buckets be somewhat similar in cross section, sufficiently so as to be nestable and operative for the purposes of this invention. The outer bucket 14 has a bottom floor 16 from which the outer wall 18 extends up and is provided with a handle 20, which, as illustrated, is a bail type of handle on which is an enlarged hand grip 22. Also extending up from the outer bucket bottom floor 16 is an outer bucket inner wall 24 providing an annular space 26, which space 26 is, in operation, partially filled with water 28.

The inner bucket 12 has a top rim 30 to which is secured a bail handle 32. Depending from the rim 30 is an inner bucket outer wall 34 of a size and shape to extend down into the outer bucket annular space 26 substantially midway between the outer bucket concentric walls 18 and 24, of course, the depending wall 34 extends into the water 28 when such is present in operation. Also depending from the rim 30 is the inner bucket inner wall 36 of a size and shape to nest or fit within the outer bucket inner wall 24 and be spaced at least slightly therefrom. Extending from the bottom of the depending inner wall 36 is the inner bucket bottom floor 38. A desired amount of water 40 in the inner bucket 12 carries the live bait to be aerated by this invention and kept live and healthy until the bait is to be used.

The water 28 in the annular space 26 acts as a seal to trap and somewhat compress the air between the inner bucket bottom floor 38 and the outer bucket bottom floor 16, and it is this trapped and partly compressed air that is used for aerating the water 40 as shown at bubbles 42. To provide this aerating air 42, there is provided an air inlet tube 44 secured at 46 to the wall 36 and connected to an opening 48 through the wall 36 to the space 50 between the inner bucket walls 34 and 36 and thus to any air trapped between the inner bucket floor 38 and the outer bucket floor 16. The tube 44 stops short somewhat of the bucket floor 38, and adjacent its open bottom end 52 there is a spiral of air escape openings 54 of various sizes.

Fitting snugly yet rotatably within this open bottom end 52 and extending upwardly above the top of the spirally located openings 54 is a manually controllable valve mechanism 56 shown separately in FIG. 2. This valve mechanism includes a vertically extending solid circular rod portion 58 that fits snugly yet rotatably within the tube open bottom end 52 to above the topmost opening 54. A transverse slot 60, which may be diametrical, extends down from the top of the rod portion 58 as far as the bottommost opening 54, but stops short of the open bottom end 52 of the air inlet tube 44. The horizontal leg 62 rests on the inner bucket floor 38. As shown, using the leg 62 as a handle, the valve mechanism 56 may be rotated to bring the slot 60 into selected alignment with at least one of the various sized air escape openings 54 to thus control the rate of aeration 42 into the water 40. It usually takes 30 to about 60 minutes, more or less, for the air trapped between the bucket floors to escape through the openings 54 into the water 40, and, of course, it is the force of gravity acting on the inner bucket 12, and its contained water 40, that forces the air through the tube 44 into the water 40.

Once the trapped air has escaped, it is necessary to replenish it so that the aeration may continue. To provide for this, a manually openable and closeable valve 64 is connected to an opening 66 through inner bucket inner wall 36 to the space 50 between its inner wall 36 and outer depending wall 34. When valve 64 is opened, it breaks the vacuum between the inner and outer buckets, permitting the inner bucket 12 to be lifted by its handle 32 as far as desired, all the way apart, if desired. Then, the valve 64 is closed, trapping the air between the buckets. When the inner bucket is again permitted to descend under the force of gravity into the outer bucket, the aerating air bubbles 42 are again fed through the bait carrying water 40. At the end of a half hour to an hour, depending on the rate of escape to the air bubbles 42, as determined by the valve mechanism 56, the air valve 64 is again opened to permit the inner bucket to be lifted, and then closed, to trap the air between the buckets as the inner bucket 12 again descends into the outer bucket 14 while aerating the water 40.

The buckets 12 and 14 are preferably of a suitable plastic material, such as in conventional pails or buckets now on the market, and the tube 44 may also be of similar plastic material. The valve mechanism 56, for controlling the rate of aeration, may be of plastic or metal, preferably of copper, while the bail handles 32 and 20 may be conventionally of wire or plastic. Valve 64 is conventional, and when rotated in one direction, lets air through and in the other direction, seals the opening 66 through the inner bucket inner wall 36.

OPERATION OF THE INVENTION

In operation, with the buckets 12 and 14 separated, water 28 is placed in the annular space 26 to the desired height, to provide a seal into which the inner bucket outer wall 34 may be inserted, trapping air between the bucket floors 16 and 38. Water 40, for receiving the live bait, is placed in the inner bucket, valve 64 being in closed position, and aeration valve control mechanism 56 is rotated to adjust the rate of aeration as desired. Aeration will then continue for a half hour to an hour, more or less. When the inner bucket has descended into the outer bucket, as illustrated, the fisherman knows that it is time to open manual air inlet valve 64, lift inner bucket 12 by its bail handle 32 the desired amount, then close air inlet valve 64, and then leave it alone until the inner bucket has again descended approximately the full amount, whereupon the operation is repeated, which may be as often as desired, keeping the water aerated and the bait in good healthy condition.

ABSTRACT OF THE DRAWING

In the drawing, like numbers refer to like parts, and for the purposes of explication, set forth below are the numbered parts of the improved aerated bait keeper:

10 aerated bait keeper of this invention
12 inner bucket
14 outer bucket
16 bottom floor of 14
18 outer wall of 14
20 handle on 14
22 enlarged handle grip on 20
24 inner wall on 14 upstanding on 16
26 annular space between 18 and 24
28 sealing water in 26
30 top rim of 12
32 bail handle on 30
34 outer wall depending from 30 of 12
36 inner wall of 12, from 30 to 38
38 bottom floor of 12
40 bait carrying water in 12
42 aerating air bubbles in 40
44 air inlet tube
46 securement of 44 to wall 36
48 air inlet through 36 to 44
50 annular space between inner bucket walls 34 and 36
52 open bottom end of 44
54 spiral of various size openings through 44 adjacent 52
56 valve mechanism for bottom of 44
58 circular rod portion of 56 in and adjacent bottom of 44
60 transverse slot in top of 58
62 handle legs of 58
64 manual air valve through 36
66 opening through 36 at 64 to 50

Although this invention has been described in considerable detail, such description is intended as being illustrative rather than limiting, since the invention may be variously embodied.

Having thus set forth and disclosed the nature of this invention, what is claimed is:

1. An aerated bait keeper (10) comprising an inner bucket (12) nestable within an outer bucket 14, said outer bucket comprising an outer wall (18), a handle means (20 and 22) on said outer bucket wall (18), a bucket floor (16) at the bottom of said outer wall (18), an outer bucket inner wall (24) upstanding on said floor (16) providing an annular space (26) between said outer bucket inner and outer walls, said annular space (26) being open at its top and adapted to receive some water therein, said nesting inner bucket (12) comprising a top rim (30), a bail handle (32) secured to said top rim (30), an outer wall (34) depending from said rim (30) of a diameter and shape to fit within said annular space 26 between said outer bucket outer (18) and inner walls (24), an inner bucket inner wall (36) depending from said rim (30) and nestable with said outer bucket inner upstanding wall (24), an inner bucket floor (38) secured at the bottom of said inner bucket depending inner wall (36) to support bait water (40) within said inner bucket, an air inlet tube 44 depending into the bait water adjacent to but spaced from said inner bucket floor (38) and secured (46) to said inner bucket inner wall (36) at an opening (48) therethrough above the bait water normal level, said inlet tube (44) having aerating air escape means (54) adjacent its bottom open end (52), valve mechanism 56 for controlling said aerating air escape means, a manually controllable air valve (64) on said inner bucket inner wall (36) above the bait water normal level, said bucket inner wall (36) having an opening (66) from said manually controllable valve (64) to the space (50) between said inner bucket inner and outer walls (36 and 34) whereby, when said buckets are nested, the water (28) between said outer bucket walls (18 and 24) acts as a seal to trap air between said inner and outer buckets while said manually closeable valve (64) is in closed position, the weight of said inner bucket and its bait water (40) forcing such trapped air through said air inlet tube (44) and its said valve mechanism to aerate the bait water therein, said manually operable valve means (64) being openable to replace the escaped trapped air as the inner bucket is lifted and then closeable to trap a new supply of air for continuing the aeration of the bait water.

2. The keeper of claim 1, said inlet tube aerating air escape means comprising various sized openings in said inlet tube adjacent its bottom, said valve controlling mechanism (56) being adjustable to select a desired size escape opening.

3. The keeper of claim 2, said various sized air escape openings (54) being spirally located, said valve controlling mechanism being rotatable to select the desired air escape opening.

4. The keeper of claim 3, said valve controlling mechanism being a rod (58) snugly yet rotatably fitting in said inlet tube open bottom end (52), said rod having air feed means (60) through its top end alignable with a selected aerating air escape opening (54).

5. The keeper of claim 4, said air feed means comprising a slot (60) extending down into said rod (58) from its top and stopping short of said inlet tube bottom end (52).

6. The keeper of claim 5, said valve controlling mechanism (52) operating means comprising a handle leg (62) depending from said rod (58) below said inlet tube open bottom end (52) and resting on said inner bucket floor (38).

7. The keeper of claim 6, said rod slot (60) extending transversely of said rod.

* * * * *